(12) United States Patent
Yang et al.

(10) Patent No.: US 11,858,419 B2
(45) Date of Patent: Jan. 2, 2024

(54) FATIGUE DRIVING MONITORING, REMINDING AND EARLY-WARNING METHOD AND SYSTEM BASED ON COMPUTER VISION

(71) Applicants: Tianjin Chengjian University, Tianjin (CN); Xi'an University of Architecture and Technology, Xi'an (CN)

(72) Inventors: Bin Yang, Tianjin (CN); Dacheng Jin, Tianjin (CN); Pengju Liu, Tianjin (CN); Yuyao Guo, Tianjin (CN); Xiaogang Cheng, Tianjin (CN); Angui Li, Tianjin (CN)

(73) Assignees: TIANJIN CHENGJIAN UNIVERSITY, Tianjin (CN); XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 297 days.

(21) Appl. No.: 17/517,849

(22) Filed: Nov. 3, 2021

(65) Prior Publication Data
US 2022/0340079 A1    Oct. 27, 2022

(30) Foreign Application Priority Data

Apr. 26, 2021   (CN) .......................... 202110456115.1

(51) Int. Cl.
*B60Q 9/00*     (2006.01)
*B60N 2/90*     (2018.01)
(Continued)

(52) U.S. Cl.
CPC ........... *B60Q 9/00* (2013.01); *B60H 1/00785* (2013.01); *B60N 2/90* (2018.02); *G01C 21/3476* (2013.01);
(Continued)

(58) Field of Classification Search
CPC .. B60Q 9/00; B60H 1/00785; B60H 1/00742; B60N 2/90; B60N 2002/981;
(Continued)

(56) References Cited

U.S. PATENT DOCUMENTS

2015/0363657 A1* 12/2015 Shigemura ............... A61B 5/18
                                                 382/104
2019/0197329 A1*  6/2019 Aoyagi ................. G06V 40/20
(Continued)

FOREIGN PATENT DOCUMENTS

CN          111634288 A    *  9/2020

*Primary Examiner* — Kurt Philip Liethen
(74) *Attorney, Agent, or Firm* — WPAT, P.C.

(57) ABSTRACT

Fatigue driving monitoring, reminding and early-warning method and system based on computer vision are provided. The system includes: a fatigue real-time monitoring system for identifying fatigue characteristic postures of a driver and obtaining a fatigue level according to frequencies of the fatigue characteristic postures and a driving time; a fatigue automatic reminding system for receiving the fatigue level, obtaining a vehicle real-time position information and providing the driver with a corresponding grade of reminder according to the fatigue level; and a fatigue information early-warning system for receiving the fatigue level and the vehicle real-time position information to obtain a fatigue safety index, so that a cloud map of fatigue road conditions is obtained according to the fatigue safety index and shared with traffic management departments and drivers for early-warning. It reduces the situation of fatigue driving on freeway and the hazard of traffic safety accidents caused by fatigue driving.

11 Claims, 3 Drawing Sheets

(51) Int. Cl.
  *G06V 20/59* (2022.01)
  *B60H 1/00* (2006.01)
  *G01C 21/34* (2006.01)
  *G08G 1/01* (2006.01)

(52) U.S. Cl.
  CPC ....... *G01C 21/3484* (2013.01); *G06V 20/597* (2022.01); *B60N 2002/981* (2018.02); *G08G 1/0112* (2013.01)

(58) Field of Classification Search
  CPC ............ G01C 21/3476; G01C 21/3484; G06V 20/597; G06V 40/103; G08G 1/0112; G08B 21/06; G08B 27/006; G08B 25/08
  See application file for complete search history.

(56) References Cited

U.S. PATENT DOCUMENTS

| | | | | |
|---|---|---|---|---|
| 2019/0362133 | A1* | 11/2019 | Margolin | G06V 40/174 |
| 2020/0164797 | A1* | 5/2020 | Akachi | G08B 3/10 |
| 2020/0342756 | A1* | 10/2020 | MacKenzie | G08G 1/16 |
| 2021/0357670 | A1* | 11/2021 | Wu | G06V 20/56 |
| 2021/0403004 | A1* | 12/2021 | Alvarez | G06F 18/214 |
| 2022/0011132 | A1* | 1/2022 | Jia | B60Q 9/008 |
| 2022/0034674 | A1* | 2/2022 | Furukawa | G01C 21/3629 |
| 2022/0196423 | A1* | 6/2022 | Homma | G01C 21/3484 |

\* cited by examiner

FATIGUE DRIVING MONITORING, REMINDING AND EARLY-WARNING METHOD AND SYSTEM BASED ON COMPUTER VISION

FIELD OF THE DISCLOSURE

The disclosure relates to the field of intelligent transportation technologies, and more particularly to fatigue driving monitoring, reminding and early-warning method and system based on computer vision.

BACKGROUND OF THE DISCLOSURE

Freeways play a decisive role in the development of cities and the constructions of economic regions due to their advantages such as convenience, speed and direct access. However, the number of deaths due to traffic accidents is increasing year by year, and traffic accidents caused by behaviors such as fatigue driving of drivers accounted for the majority. Vehicles bring a great convenience to people's travel, especially due to the continuous development of the logistics industry, the rapid increase in the number of people shopping online, and the sharp increase in the purchase frequency and number of pieces, which have increased the number of vehicles and driving time on the freeway, and even some vehicle drivers will carry out high-intensity, concentrated long-term fatigue driving in a short period of time. If the dangerous situation of fatigue driving is not monitored in real time, promptly reminded, effective early-warning and strict control, a large number of extremely dangerous traffic accidents will be caused. The above problems are severe and intractable problems that need to be solved urgently in national traffic management.

The management and control of the fatigue driving situation of drivers on freeways are of extremely important significance. From the existing situation, the situation of fatigue driving for a long time is very serious, which is a difficult problem perplexing us for a long time. Therefore, it is necessary to warn fatigued drivers on the freeway. There are the following two problems in this process: in the process of fatigue driving control, we cannot define the fatigue state of the driver. Referring to Article 62 of the "Implementation Regulations of the Road Traffic Safety Law", "driving a vehicle continuously for more than 4 hours, the driver does not stop for a rest or stop for less than 20 minutes are considered as fatigue driving." This is only configured to define the driver's fatigue level based on the driving duration. However, due to the driver's personal constitution, labor intensity and sleep conditions before driving, there are individual differences in the definition of driver fatigue. For example, drivers have different endurance to fatigue. Under the same driving time and the same labor intensity before driving, some drivers will appear fatigue state in advance. Therefore, it is necessary to monitor the fatigue state of drivers on freeway in real time. It cannot meet monitoring requirements only by defining the time length of driving. In addition, according to Article 14 of the "Implementation Regulations of the Road Traffic Safety Law", "passenger vehicles, heavy-duty trucks, and semi-trailer tractors used for highway operations shall be equipped with and use driving recorders that meet national standards. Traffic police can check the driving speed, continuous driving time and other driving status information of motor vehicles." There are certain requirements for installing a driving recorder in the cab, which promotes the implementation of measures to install a camera in the cab to monitor the fatigue state of drivers in real time. However, at present, the driving recorder in the vehicle and the camera on the freeway are still storing and calculating a large amount of invalid data. Existing monitoring methods generally have the problems of poor real-time performance and misjudgment, which have large hidden dangers and loopholes.

Through the above analysis, it is concluded that the problem of fatigue driving of drivers on the freeway is more serious, and the existing monitoring technology is not perfect, resulting in inadequate control of fatigue driving. Therefore, by improving the problem of freeway fatigue driving, the normal traffic of freeway can be guaranteed.

SUMMARY OF THE DISCLOSURE

In order to overcome shortcomings of the prior art, an objective of the disclosure is to provide fatigue driving monitoring, reminding and early-warning method and system based on computer vision, which can monitor the fatigue state of vehicle drivers on freeways in real time, and gives corresponding emergency reminders and feedback early-warning information to the traffic management department and other vehicles, so as to reduce the situation of fatigue driving on the freeway and reduce the hazards of traffic safety accidents caused by fatigue driving.

In order to achieve the above-mentioned purpose, in one aspect, the disclosure provides a fatigue driving monitoring, reminding and early-warning system based on computer vision, including a fatigue real-time monitoring system, a fatigue automatic reminding system, and a fatigue information early-warning system. The fatigue real-time monitoring system is configured (i.e., structured and arranged) to identify fatigue characteristic postures of a driver, and obtain a fatigue level according to frequencies of the fatigue characteristic postures and a driving time.

The fatigue automatic reminding system is configured to receive the fatigue level, obtain a vehicle real-time position information, and provide the driver with a corresponding grade of reminder according to the fatigue level.

The fatigue information early-warning system is configured to receive the fatigue level sent by the fatigue real-time monitoring system and the vehicle real-time position information sent by the fatigue automatic reminding system, obtain a fatigue safety index according to numbers of vehicles corresponding to different fatigue levels of every predetermined number of kilometers of freeway section, obtain a cloud map of fatigue road conditions according to the fatigue safety index, and share the cloud map of fatigue road conditions with all traffic management departments and all drivers on freeways for early-warning. The predetermined number of kilometers is 10 km.

In an embodiment of the disclosure, the fatigue real-time monitoring system may include a video recording device (for example a video recorder), a driving timing device (for example including a timer for recording the driving time) and an analysis processing module (also referred to as analysis processor).

The video recording device is configured to monitor and record action states of the driver in real time, and send video image information recording the action states of the driver to the analysis processor.

The driving timing device is configured to record the driving time and send the driving time to the analysis processor.

The analysis processor is configured to receive the video image information and the driving time, generate digital information from the video image information recording the action states of the driver, identify the fatigue characteristic postures of the driver, and obtain the fatigue level of the driver in combination with the driving time.

In an embodiment of the disclosure, the analysis processor is concretely configured to identify the fatigue characteristic postures of the driver based on skeletal node recognition. The fatigue characteristic postures are classified into three levels, including a first-level fatigue characteristic posture including stretching and yawning, a second-level fatigue characteristic posture including frequent blinking and rubbing eyes, and a third-level fatigue characteristic posture including closing eyes and frequent nodding.

In an embodiment of the disclosure, the fatigue level is one of four levels including: normal state, mild fatigue, moderate fatigue and severe fatigue.

The normal state is that:
the driving time is less than or equal to 3 hours since the vehicle is started, and during which none of the fatigue characteristic postures of the driver has been detected.

The mild fatigue is selected from the group consisting of that:
(1) the driving time is more than 3 hours and less than 3.5 hours since the vehicle is started, and during which none of the fatigue characteristic postures of the driver has been detected;
(2) the driving time is less than 3 hours since the vehicle is started, and during which the first-level fatigue characteristic posture of the driver has been detected once; and
(3) the driving time is less than 2 hours since the vehicle is started, and during which the second-level fatigue characteristic posture of the driver has been detected once.

The moderate fatigue is selected from the group consisting of that:
(1) the driving time is more than 3.5 hours and less than 4 hours since the vehicle is started, and during which none of the fatigue characteristic posture of the driver has been detected;
(2) the driving time is more than 3 hours and less than 4 hours since the vehicle is started, and during which the first-level fatigue characteristic posture of the driver has been detected once;
(3) the driving time is more than 2 hours and less than 3.5 hours since the vehicle is started, and during which the second-level fatigue characteristic posture of the driver has been detected once;
(4) the driving time is less than 3 hours since the vehicle is started, and during which another first-level fatigue characteristic posture of the driver occurs within 10 minutes after one first-level fatigue characteristic posture of the driver has been detected;
(5) the driving time is less than 2.5 hours since the vehicle is started, and during which one second-level fatigue characteristic posture of the driver occurs within 10 minutes after one first-level fatigue characteristic posture of the driver has been detected;
(6) the driving time is less than 2.5 hours since the vehicle is started, and during which one first-level fatigue characteristic posture of the driver occurs within 10 minutes after one second-level fatigue characteristic posture of the driver has been detected; and
(7) the driving time is less than 2 hours since the vehicle is started, and during which another second-level fatigue characteristic posture of the driver within 10 minutes after one second-level fatigue characteristic posture of the driver has been detected.

The severe fatigue is selected from the group consisting of that:
(1) in any case where the driving time is greater than or equal to 4 hours;
(2) the third-level fatigue characteristic posture of the driver has been detected once or more than once in any driving time since the vehicle is started;
(3) the driving time is more than 3.5 hours since the vehicle is started, and during which the second-level fatigue characteristic posture of the driver has been detected once;
(4) the driving time is more than 3 hours since the vehicle is started, and during which another first-level fatigue characteristic posture of the driver occurs within 10 minutes after one first-level fatigue characteristic posture of the driver has been detected;
(5) the driving time is more than 2.5 hours since the vehicle is started, and during which one second-level fatigue characteristic posture of the driver occurs within 10 minutes after one first-level fatigue characteristic posture of the driver has been detected;
(6) the driving time is more than 2.5 hours since the vehicle is started, and during which one first-level fatigue characteristic posture of the driver occurs within 10 minutes after one second-level fatigue characteristic posture of the driver has been detected; and
(7) the driving time is more than 2 hours since the vehicle is started, and during which another second-level fatigue characteristic posture of the driver within 10 minutes after one second-level fatigue characteristic posture of the driver is monitored.

In an embodiment of the disclosure, the fatigue real-time monitoring system is further configured to monitor a cold uncomfortable posture and a hot uncomfortable posture of the driver. The fatigue real-time monitoring system may further include an air temperature and humidity monitoring device (for example including a temperature sensor and a humidity sensor), and the air temperature and humidity monitoring device is configured to monitor an air temperature and a humidity in a cab of the vehicle. The fatigue real-time monitoring system may further include a $CO_2$ concentration monitoring device (for example including a $CO_2$ concentration sensor), and the $CO_2$ concentration monitoring device is configured to monitor the $CO_2$ concentration in the cab of the vehicle.

In an embodiment of the disclosure, the fatigue automatic reminding system may include an intelligent voice device (also referred to as intelligent voice module, for example including a speaker and a microphone), a global positioning system locator (also referred to as global positioning module), a navigation device (also referred to as navigation module, for example including a navigator), a vibrating seat device (for example a seat with vibrating function), and a cab air conditioning device (for example including an air conditioner). The intelligent voice device, the vibrating seat device, and the cab air conditioning device receive the fatigue level and make a corresponding response according to the fatigue level. The global positioning system locator is configured to determine a real-time position, a driving speed, and a driving direction of the vehicle. The navigation device is configured to obtain a distance between a current position of the vehicle and a target position, and a shortest route. The cab air conditioning device is configured to adjust a temperature and a humidity of the cab.

In an embodiment of the disclosure, when the fatigue level is a normal state, the fatigue automatic reminding system gives no response, and each of the systems operates normally. When the fatigue level is a mild fatigue, the intelligent voice device broadcasts: "you are in the mild fatigue, please slow down". When the fatigue level is a moderate fatigue, the intelligent voice device broadcasts: "you are in the moderate fatigue, please slow down immediately and rest in a nearest rest area", and the navigation device displays a route between the current position of the vehicle and the nearest rest area of the freeway. When the fatigue level is a severe fatigue, the intelligent voice device broadcasts: "you are in the severe fatigue, please slow down immediately and rest in the nearest rest area!", the navigation device displays a route between the current position of the vehicle and the nearest rest area of the freeway, the vibrating seat device starts a vibration with random high amplitude and high frequency, and the cab air conditioning device sends cooled air with a low temperature and a high speed.

In an embodiment of the disclosure, the fatigue information early-warning system may include an online communicator (also referred to as online communication module) and a server. The online communicator is configured to send the fatigue level and the vehicle real-time position information to the server. The server is configured to integrate the fatigue level and position information of drivers to obtain the fatigue safety index in every 10 km of freeway section, then send the obtained fatigue safety index to the fatigue real-time monitoring system, and the fatigue real-time monitoring system draws a real-time cloud map of fatigue road conditions and share the real-time cloud map of fatigue road conditions to the traffic management departments and the drivers.

In an embodiment of the disclosure, the fatigue safety index is one of four levels including safe road section, low-risk road section, medium-risk road section and high-risk road section. The safe road section refers to a 10 km of freeway section on which the fatigue level of each of drivers for all vehicles is the normal state.

The low-risk road section refers to a 10 km of freeway section on which there are greater than 0 and less than or equal to 5 vehicles whose fatigue level of each driver is the mild fatigue.

The medium-risk road section refers to one selected from the group consisting of: a 10 km of freeway section on which there are greater than 5 and less than or equal to 10 vehicles whose the fatigue level of each driver is the mild fatigue, and a 10 km of freeway section on which there are greater than 0 and less than or equal to 5 vehicles whose the fatigue level of each driver is the moderate fatigue.

The high-risk road section refers to the one selected from the group consisting of: a 10 km of freeway section on which there are more than 10 vehicles whose the fatigue level of each driver is the mild fatigue, a 10 km of freeway section on which there are greater than 5 and less than or equal to 10 vehicles whose the fatigue level of each driver is the moderate fatigue, and a 10 km of freeway section on which there are more than or equal to 1 vehicle whose the fatigue level of each driver is the severe fatigue.

In another aspect, the disclosure further provides fatigue driving monitoring, reminding and early-warning method based on computer vision, and the specific steps may include:

S1, monitoring a driving time, identifying fatigue characteristic postures of a driver, and obtaining a fatigue level according to the driving time and a result of identifying the fatigue characteristic postures;

S2, providing the driver with a corresponding grade of reminder according to the fatigue level and obtaining a vehicle real-time position information to plan a route to a nearest rest area when the fatigue level exceeds a level threshold; and S3, obtaining the fatigue level and the vehicle real-time position information, obtaining a fatigue safety index according to the fatigue level and the vehicle real-time position information, drawing a cloud map of fatigue road conditions according to the fatigue safety index, and sharing the cloud map of fatigue road conditions to traffic management departments and drivers for early-warning.

Compared with the related art, the embodiments of the disclosure may have one or more of the following beneficial effects:

the disclosure provides the fatigue driving monitoring, reminding and early-warning system based on computer vision. The fatigue characteristic postures of the driver are detected through a non-contact measurement of the fatigue real-time monitoring system, and the fatigue level is obtained according to the frequencies of the fatigue characteristic postures and the driving time, which not only greatly reduces the possibility of misjudgment, but also has high real-time performance. Moreover, the fatigue automatic reminding system can provide multiple reminders and stimulations to the driver according to the fatigue level, so that the fatigued driver can stay awake for a period of time, and have a good interference effect on the fatigued driver. At the same time, the fatigue automatic reminding system can obtain the vehicle real-time position information and calculate the rest area that can be reached most conveniently and quickly, so as to let the fatigued driver rest as soon as possible and reduce unnecessary driving time. In addition, the fatigue information early-warning system can quantify the driving safety of the road section according to the vehicle position information in fatigue driving on the road section and the fatigue level of drivers, and obtain the fatigue safety index according to numbers of vehicles corresponding to different fatigue levels. According to the fatigue safety index, the cloud map of fatigue road conditions is obtained and shared with all traffic management departments and all drivers on the freeways for early-warning, which has strong early-warning.

Further, according to the "Implementation Regulations of the Road Traffic Safety Law", the driver's fatigue state is judged according to the limit of the driving time of the driver or the electronic camera on the freeway to judge the fatigue state of the driver. The above two methods have a high misjudgment rate for judging the driver's fatigue state. The video recording device of the disclosure is based on computer vision, uses a common camera to take video of the driver, and obtains the human body postures according to human skeletal nodes by using OpenPose algorithm, then compares the obtained human postures with the defined postures to thereby judge the fatigue characteristic postures of the driver, and obtains the fatigue level by combining the driving time of the vehicle, which greatly reduces the possibility of misjudgment.

Further, the fatigue automatic reminding system of the disclosure includes the intelligent voice device, the cab air conditioning device, and the vibrating seat device, which can respond to different fatigue levels of the driver to achieve the purpose of keeping the driver awake for a period of time, so that the driver is kept awake until reaching the rest area given by the navigation, which has a better interference reminder effect.

Further, the monitoring, reminding and early-warning system of the disclosure uses the fatigue level and position information of vehicle drivers on all freeway sections to obtain the fatigue safety index for every 10 km of freeway section, and draws the fatigue safety index into a real-time cloud map of fatigue road conditions and shares it with the traffic management departments. The traffic management departments can receive the real-time cloud map of fatigue road conditions of the road section under its jurisdiction, and analyze and control the road conditions in time. The traffic management departments can make control according to the safety index of the road section, give corresponding reminders and warnings to drivers, and send warnings through the cloud to remind drivers to choose an opportunity to drive into the service area for rest. When the driver does not drive into the service area, the traffic management department will make some penalties and mandatory measures according to the drivers' fatigue driving.

DETAILED DESCRIPTION OF EMBODIMENTS

Figure 1:
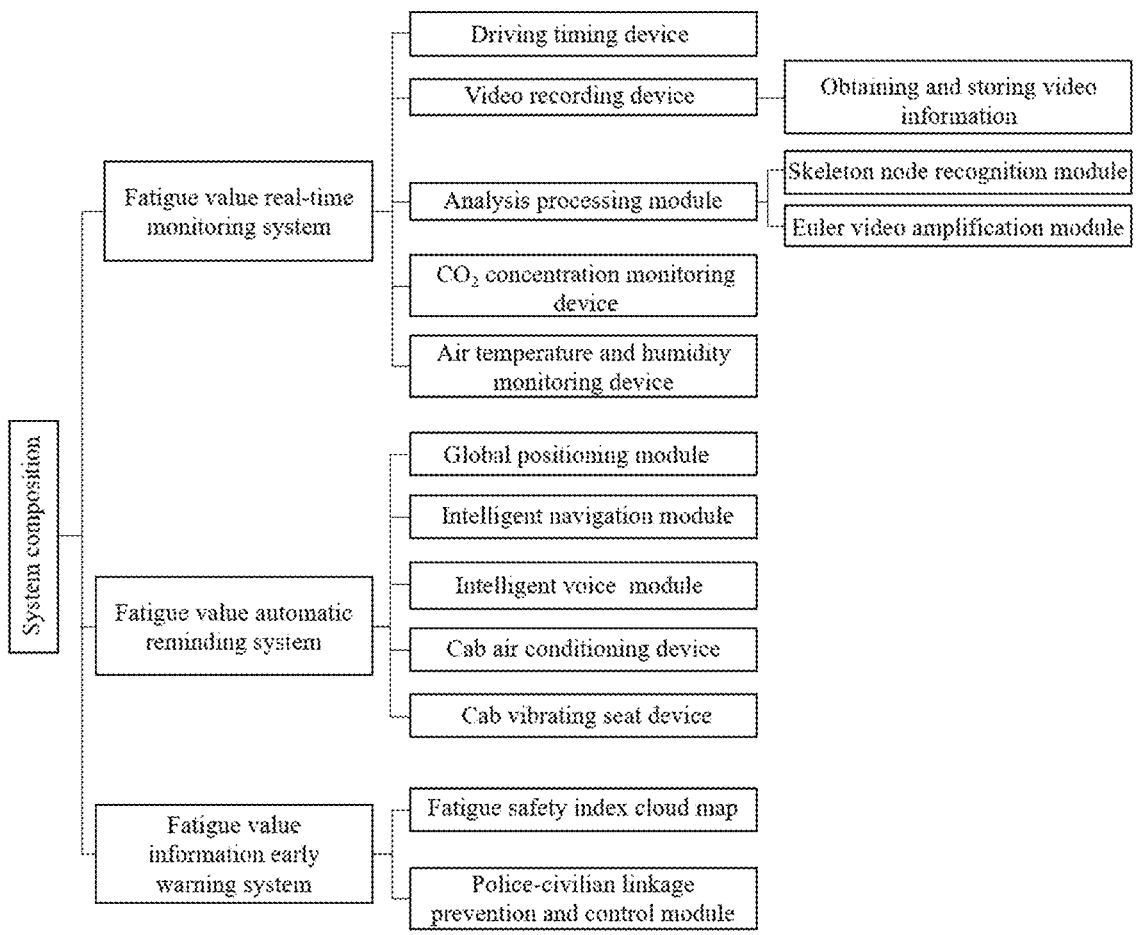
FIG. 1 is a schematic structural view of a fatigue driving monitoring, reminding and early-warning system according to the disclosure.

The disclosure will be further described below in combination with the accompanying drawings and illustrated embodiments.

The disclosure assists the traffic management department to control the fatigued drivers of the freeway from three aspects.

In the first aspect, from the perspective of the driver, the common camera is placed in the vehicle cab to collect real-time driving video information of the driver, such as the driver's fatigue characteristic postures, and then a reasonable fatigue level of the driver is calculated through the built-in module of the camera through the corresponding algorithm. The corresponding "interference" is made to the driver through the obtained fatigue level, which is made according to the fatigue level of the driver, so as to keep the driver awake for a period of time and maintain the driver to reach the rest area given by the navigation.

In the second aspect, from the perspective of surrounding drivers, the number of fatigued drivers and their fatigue levels in the road section they are driving at the same time are processed, analyzed and integrated to obtain the fatigue safety index of this road section. According to the fatigue safety index of each road section, the cloud map of fatigue road conditions of this road section is drawn and uploaded to the cloud. The cloud map of fatigue road conditions is fed back to the surrounding drivers in real time through the mobile phone application. The surrounding drivers can make a judgment according to the fatigue safety index of the road section to be driven into. When the fatigue safety index is low, the driver can choose to drive into the service area to rest and wait or continue driving at a selected time. Through the above measures to achieve the purpose of early-warning of the surrounding driving vehicles, and try to avoid serious traffic accidents.

In the third aspect, from the perspective of traffic management departments, the information of the driver's fatigue characteristic postures, driving time and cloud map of fatigue road conditions will be fed back to the traffic management departments. The traffic management departments can make control according to the fatigue safety index of the road section and give corresponding reminders and warnings to the driver. For example, when a driver drives for 2 hours with mild fatigue, the traffic management departments will send a warning through the cloud to remind the driver to choose an opportunity to driver into the service area for rest. When the driver does not driver into the service area, the traffic management department will make some penalties and mandatory measures according to the driver's fatigue driving.

Specifically, the disclosure provides a fatigue driving monitoring, reminding and early-warning method based on computer vision. The specific steps are as follows:

step S1, monitoring a driving time, identifying the fatigue characteristic postures of a driver, and obtaining a fatigue level according to the driving time and a result of identifying the fatigue characteristic postures;

step S2, providing the driver with a corresponding grade of reminder corresponding the fatigue level according to the fatigue level and obtaining a vehicle real-time position information to plan a route to a nearest rest area, when the fatigue level exceeds a level threshold; and step S3, obtaining the fatigue level and the vehicle real-time position information, obtaining a fatigue safety index according to the fatigue level and the vehicle real-time position information, then drawing a cloud map of fatigue road conditions according to the fatigue safety index, and sharing the cloud map of fatigue road conditions to all traffic management departments and all drivers on freeways for early-warning.

Referring to FIG. 1, the above method is applied to a fatigue driving monitoring, reminding and early-warning system based on computer vision provided by the disclosure, and is particularly suitable for fatigue driving monitoring, reminding and early-warning of drivers of heavy-duty trucks.

The fatigue driving monitoring, reminding and early-warning system of the disclosure may include a fatigue real-time monitoring system, a fatigue automatic reminding system and a fatigue information early-warning system. The fatigue real-time monitoring system is configured to monitor fatigue degree of driver on freeway, specifically, judges fatigue degree of the driver according to posture information of the monitored driver, and then the fatigue level is quantified as a fatigue level. The fatigue automatic reminding system can provide emergency treatment for fatigued drivers under different conditions to ensure traffic safety. The fatigue information early-warning system can provide online warning information to the traffic management departments and drivers of surrounding vehicles, thereby reducing the incidence of traffic accidents caused by fatigue driving.

A video recording device of the fatigue real-time monitoring system can record and monitor state characteristics such as limb movement and facial state of the vehicle driver, an analysis processor (also referred to as an analysis processing module) can identify the fatigue characteristic postures of the vehicle driver, and a driving timer (also referred to as a driving timing module) can record the driving time of the vehicle. According to frequencies of the driver's fatigue characteristic postures during a certain period of time and the driving time (that is, referring to the fatigue level comparison table 1), the current driver's fatigue level can be obtained, which also reflects the current driver's fatigue level.

Specifically, the fatigue real-time monitoring system may include the video recording device for example a video recorder, the driving timer, and the analysis processor.

The video recording device is installed on a rear-view mirror to monitor and record the driver's limb movements, facial postures and other state characteristics in real time. The video recording device sends the recorded video image information to the analysis processor.

The driving timer is configured to record the driving time and send the driving time to the analysis processor;

The analysis processor is configured to receive the video image information, generate digital information according to the recorded video image information, identify and record the driver's facial postures and motion posture information, and thereby identifying the driver's fatigue characteristic postures, cold uncomfortable posture and hot uncomfortable posture and then analyzing a real-time state of the driver.

In one illustrated embodiment, the analysis processor is configured to identify the fatigue characteristic postures of the driver according to skeletal node recognition, such as stretching, yawning, frequent blinking, rubbing eyes, closing eyes, frequent nodding, etc. In this way, the fatigue real-time monitoring system can automatically identify the real-time state of drivers without affecting the driving behavior of drivers. As the "eye" of the whole fatigue driving monitoring, reminding and early-warning system based on the computer vision, the information identified by the fatigue real-time monitoring system is used to make the fatigue automatic reminding system remind drivers in time, and also to make the fatigue information early-warning system send out early-warning information.

Specifically, the disclosure classifies common fatigue postures of the human body, such as stretching, yawning, frequent blinking, rubbing eyes, closing eyes, frequent nodding, etc., into three levels of fatigue characteristic postures, including:
  a first-level fatigue characteristic posture, including stretching and yawning;
  a second-level fatigue characteristic posture, including frequent blinking and rubbing eyes; and
  a third-level fatigue characteristic posture, including closing eyes and frequent nodding.

In one illustrated embodiment, the disclosure combines the frequencies of the fatigue characteristic postures of the driver and the driving time for any time after the vehicle is started to obtain the fatigue level. In order to more conveniently quantify the fatigue degree of the drivers as a fatigue level, the disclosure defines four fatigue levels (0, 1, 2, 3) of 0 (normal state), 1 (mild fatigue), 2 (moderate fatigue) and 3 (severe fatigue), which characterize the fatigue degree of the drivers.

The fatigue level is obtained by comprehensively quantifying the frequencies of these characteristic fatigue postures and the driving time, based on national traffic rules.

Specifically, the normal state 0 is that the driving time is less than or equal to 3 hours since the vehicle is started, and during which none of the fatigue characteristic postures of the driver has been detected.

Specifically, the mild fatigue 1 is selected from the group consisting of that:
1) the driving time is more than 3 hours and less than 3.5 hours since the vehicle is started, and during which none of the fatigue characteristic posture of the driver has been detected;
2) the driving time is less than 3 hours since the vehicle is started, and during which the first-level fatigue characteristic posture of the driver has been detected once; and
3) the driving time is less than 2 hours since the vehicle is started, and during which the second-level fatigue characteristic posture of the driver has been detected once.

Specifically, the moderate fatigue 2 is selected from the group consisting of that:
1) the driving time is more than 3.5 hours and less than 4 hours since the vehicle is started, and during which none of the fatigue characteristic postures of the driver has been detected;
2) the driving time is more than 3 hours and less than 4 hours since the vehicle is started, and during which the first-level fatigue characteristic posture of the driver has been detected once;
3) the driving time is more than 2 hours and less than 3.5 hours since the vehicle is started, and during which the second-level fatigue characteristic posture of the driver has been detected once;
4) the driving time is less than 3 hours since the vehicle is started, and during which another first-level fatigue characteristic posture of the driver occurs within 10 minutes after one first-level fatigue characteristic posture of the driver has been detected;
5) the driving time is less than 2.5 hours since the vehicle is started, and during which one second-level fatigue characteristic posture of the driver occurs within 10 minutes after one first-level fatigue characteristic posture of the driver has been detected;
6) the driving time is less than 2.5 hours since the vehicle is started, and during which one first-level fatigue characteristic posture of the driver occurs within 10 minutes after one second-level fatigue characteristic posture of the driver has been detected; and
7) the driving time is less than 2 hours since the vehicle is started, and during which another second-level fatigue characteristic posture of the driver within 10 minutes after one second-level fatigue characteristic posture of the driver has been detected.

Specifically, the severe fatigue 3 is selected from the group consisting of that:
1) in any case where the driving time is greater than or equal to 4 hours;
2) the third-level fatigue characteristic posture of the driver has been detected once or more than once in any driving time since the vehicle is started;
3) the driving time is more than 3.5 hours since the vehicle is started, and during which the second-level fatigue characteristic posture of the driver has been detected once;
4) the driving time is more than 3 hours since the vehicle is started, and during which another first-level fatigue characteristic posture of the driver occurs within 10 minutes after one first-level fatigue characteristic posture of the driver has been detected;
5) the driving time is more than 2.5 hours since the vehicle is started, and during which one second-level fatigue characteristic posture of the driver occurs within 10 minutes after one first-level fatigue characteristic posture of the driver has been detected;

6) the driving time is more than 2.5 hours since the vehicle is started, and during which one first-level fatigue characteristic posture of the driver occurs within 10 minutes after one second-level fatigue characteristic posture of the driver has been detected; and 7) the driving time is more than 2 hours since the vehicle is started, and during which another second-level fatigue characteristic posture of the driver within 10 minutes after one second-level fatigue characteristic posture of the driver has been detected.

In one illustrated embodiment, the fatigue level is set into the analysis processor. The analysis processor quantifies and classifies the fatigue degree of the driver according to the above principles, the fatigue characteristic postures monitored by the video recording device and the driving time recorded by the driving timer, so as to correspond to the set fatigue level one by one for subsequent processing.

The fatigue real-time monitoring system of the disclosure has advantages as following.

(1) Strong Real-Time Performance without Delay

At present, the existing station-type fatigue driving measuring devices are arranged at service area, toll station and other stations on each freeway to judge whether the driver is fatigue driving or not by recording the mileage and driving duration of the vehicle. The existing measuring device cannot track and measure the fatigue state of the driver, the vehicle only be monitored at each station, so the existing measuring device has a delay. The fatigue real-time monitoring system of the disclosure can realize real-time tracking and measurement. The fatigue real-time monitoring system is installed inside the vehicle, and the driver's fatigue degree is determined according to the real-time limb movement and facial posture of the driver, with strong real-time performance is strong.

(2) High Accuracy

At present, the existing anti-fatigue device for judging the driver according to the recorded driving time of the vehicle only judges the fatigue degree of the driver by recording the driving time, or even whether the driving time exceeds 4 hours, and does not monitor the actual state of the driver during the driving process (There is a situation where the driver does not rest well and drives again but does not exceed the fatigue judgment time, but in this case the driver is still fatigued). The fatigue real-time monitoring system of the disclosure can judge the fatigue state of the driver in real time on the basis of recording the driving time and the fatigue characteristic posture of the driver monitored by the camera, with high accuracy.

(3) Strong Pertinence

The fatigue real-time monitoring system of the disclosure can not only monitor whether the driver is fatigue driving in real time and accurately, but also determine fatigue degree of the driver according to driving time and the occurrence frequency of the fatigue characteristic posture, which is classified into the four levels: the normal state, the mild fatigue, the moderate fatigue and the severe fatigue. The system can provide corresponding response measures for different fatigue levels, and no "one-size-fits-all" measure is adopted, which not only ensure driving safety, but also ensure economic benefits.

The fatigue automatic reminding system may include an intelligent voice device (also referred to as an intelligent voice module), a global positioning system locator (also referred to as a global positioning module), a navigation device (also referred to as a navigation module), a vibrating seat device, and a cab air conditioning device. The analysis processor quantifies the fatigue degree of the driver into the fatigue level, and then sends the fatigue level to the intelligent voice device, the vibrating seat device and the cab air conditioning device respectively. According to the different fatigue levels of the driver, the intelligent voice device, the vibrating seat device and the cab air conditioning device make corresponding responses. The global positioning system locator is configured to determine a real-time position, a driving speed and a driving direction of the vehicle. The navigation device is configured to calculate a shortest route and a distance between a current position of the vehicle and a target position. It can be understood that the intelligent voice module (intelligent voice device) includes a processor and a memory connected to the processor, and the memory includes software modules, executable by the processor; the global positioning module (global positioning system locator) includes a processor and a memory connected to the processor, and the memory includes software modules, executable by the processor; and the navigation module (navigation device) includes a processor and a memory connected to the processor, and the memory includes software modules, executable by the processor.

The fatigue automatic reminding system can take different actions when the driver is at different fatigue levels: the intelligent voice device automatically reminds the driver, and the terminal devices such as the vibrating seat device, the cab air conditioning device and the navigation device make emergency and compulsory wakeful response. In this way, the fatigue automatic reminding system can promptly and accurately take reminder measures to fatigued drivers, or remind them for many times to make them aware of the fatigue state and rest, or force them to take measures to make them awake, so as to effectively avoid the occurrence of traffic safety accidents caused by fatigue driving and reduce the incidence of traffic accidents.

In one illustrated embodiment, when the fatigue real-time monitoring system monitors that the driver's fatigue level is 0, the fatigue automatic reminding system gives no response, and each of the systems operates normally.

When the fatigue real-time monitoring system monitors that the driver's fatigue level is 1, the intelligent voice device responds: broadcasts the driver's real-time fatigue level and persuades "you are now in the mild fatigue, please slow down and drive slowly".

When the fatigue real-time monitoring system monitors that the driver's fatigue level is 2, the intelligent voice device responds: broadcasts the driver's real-time fatigue level and persuades "you are now in the moderate fatigue, please slow down immediately and rest in the nearest rest area", and the navigation device displays a route between the current position of the vehicle and the nearest rest area of the freeway.

When the monitoring system detects that the driver's fatigue level is 3, the intelligent voice device responds: broadcasts the driver's real-time fatigue level and persuades "you are now in the severe fatigue, please slow down immediately and rest in the nearest rest area!", the navigation device displays a route between the current position of the vehicle and the nearest rest area of the freeway, the vibrating seat device starts a vibration with random high frequency and high amplitude, and the cab air conditioning device sends cooled air with a low temperature and a high speed.

Due to fatigue driving, the driver cannot rest in the emergency lane. When the driver drives a long distance and become sleepy, the driver should go to the nearest server to rest as soon as possible, and the driver cannot occupy the emergency lane under normal circumstances. Moreover, because the rest areas on the freeway are far apart, fatigued drivers may miss the best rest area due to unclear navigation. Therefore, it is necessary to provide convenient and reliable routes.

Further, the global positioning system locator of the fatigue automatic reminding system can track the position of the driving vehicle in real time, and the navigation device can calculate the most convenient and quick rest area for the driver. Specifically, the navigation device calculates the distance between the real-time position of the vehicle and the current nearest rest area, which provides effective and accurate routes for the fatigued driver to go to the rest area, so that the fatigued driver can enter the rest area to rest as soon as possible, and reduce unnecessary driving time.

The analysis processor can receive the distance information of the navigation device and combine with the real-time fatigue level information of the driver obtained by its own analysis. If the distance is too far (i.e., greater than or equal to 30 km), or the minimum driving speed on the freeway required by the traffic regulations requires that the arrival at the rest area must be more than 30 min, the driver cannot arrive at the rest area immediately, and the driver's fatigue level is 3, the situation is an emergency. At this time, the fatigue automatic reminding system is required to adopt emergency methods, that is, the vibrating seat device vibrates with high frequency and high amplitude in a continuous random period, and the cab air conditioning device sends out cooled air with low-temperature and high-speed. Such measures are taken to force the drivers to stay awake in a short time.

In an illustrated embodiment of the disclosure, the fatigue real-time monitoring system may further include a $CO_2$ concentration monitoring device and an air temperature and humidity monitoring device. The $CO_2$ concentration monitoring device is configured to monitor a $CO_2$ concentration in the cab; the air temperature and humidity monitoring device is configured to monitor an air temperature and a humidity in a cab of the vehicle.

In the illustrated embodiment, due to the low outdoor temperature in winter, the windows of the cab are often closed, which will cause the continuous rise of the $CO_2$ concentration in the cab. High concentration of $CO_2$ will distract the drivers, make them feel tired and sleepy. The $CO_2$ concentration monitoring device monitors the $CO_2$ concentration in the cab and sends the $CO_2$ concentration information to the analysis processor. When the monitored $CO_2$ concentration is higher than 1000 parts per million (ppm), the analysis processor sends a signal to the intelligent voice device to make it respond, that is, the intelligent voice device persuades the driver "the concentration of carbon dioxide in the cab is too high, please open the window for ventilation".

In the illustrated embodiment, due to the high temperature and high humidity of outdoor air parameters in summer working conditions, air with excessively high humidity and temperature will increase uncomfortable of the driver, so as to accelerate the acceleration of the driver's fatigue. The air temperature and humidity monitoring device monitors the temperature and humidity of the air in the cab, and sends the temperature and humidity information to the analysis processor. When the monitored air temperature is higher than 35° C. and the relative humidity is higher than 80%, the analysis processor sends a signal to the cab air conditioning device to turn on the cab air conditioning device at a set temperature of 24° C.

The disclosure monitors human body posture image information through the video recording device, and uses Euler video magnification algorithm to perform Fourier transform to thereby obtain a facial skin saturation. There is a linear relationship between skin color saturation and skin temperature to obtain the facial skin temperature of the driver, and then the video recording device sends the human posture image information to the analysis processor. The analysis processor identifies the cold and hot uncomfortable posture of the driver according to the driver's posture and facial skin temperature, monitors the cold and thermal state of the driver, and gives instructions to the cab air conditioning device to adjust the air volume, air temperature and wind speed, so as to make the driver in the best thermal comfort state and save the energy consumption of the cab air conditioning.

In one illustrated embodiment, the cold uncomfortable posture is defined as the driver's actions such as rubbing his hands, exhaling to his hands, and buckling his clothes; the hot uncomfortable posture is defined as the driver's actions such as wiping sweat, fanning with his hand, rolling up the sleeves, and pulling the collar. When the cab air conditioning device is turned on, if the analysis processor identifies the driver's cold uncomfortable posture, the analysis processor controls the cab air conditioning device to increase the set temperature by 1° C.; if the analysis processor identifies the hot uncomfortable posture of the driver, the analysis processor controls the cab air conditioning device to decrease its set temperature by 1° C.

Figure 3:
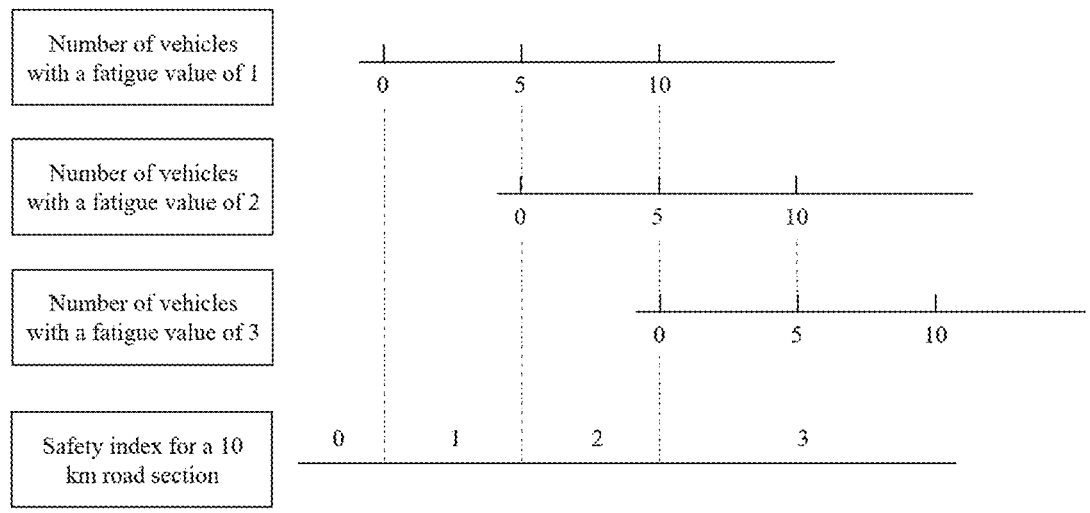
FIG. 3 is a schematic view of relationships between numbers of vehicles with different fatigue levels and fatigue safety indexes according to the disclosure.

The fatigue information early-warning system may include an online communicator (also referred to as an online communication module) and a server. The online communicator is configured to receive the fatigue level information and the vehicle real-time position information, and sends the received information to the server. The server is configured to integrate the fatigue level and position information of drivers on all freeway sections, and send the fatigue level information of all vehicle drivers on a specific freeway section to all drivers on the freeway section and the government traffic management department managing the freeway section through the online communicator according to the position information. In this way, other vehicles can not only keep a safe distance from fatigue-driving vehicles, effectively reduce traffic accidents caused by fatigue driving and avoid secondary accidents; but also enable government officials to manage fatigue-driving vehicles more conveniently and intuitively. It can be understood that the online communication module (online communicator) includes a processor and a memory connected to the processor, and the memory includes software modules, executable by the processor In one illustrated embodiment, in order to allow the fatigue information early-warning system to be more intuitive and faster in real-time warning of fatigue-driving vehicle information to surrounding vehicles, the disclosure proposes a concept of fatigue safety index. The fatigue safety index is obtained by integrating and quantifying the number of vehicles with different fatigue levels in every 10 km of freeway section and the purpose is to evaluate the risk of traffic accidents caused by vehicle fatigue driving on the freeway section through the fatigue safety index. The fatigue safety index is one of four levels, including A (safe road section), B (low-risk road section), C (medium-risk road section), and D (high-risk road section). The corresponding situation of the fatigue safety index is shown in FIG. 3. The fatigue safety index A indicates that there are no fatigue-driving vehicles on this 10 km of freeway section. The road section is safe and this road section is a safe road section.

The fatigue safety index of B indicates that there are greater 0 and less than or equal to 5 vehicles whose the fatigue level of each driver is 1 on this 10 km of freeway section, indicating that this road section is relatively safe and this road section is a low-risk section.

The fatigue safety index of C indicates that there are greater than 5 and less than or equal to 10 vehicles whose the fatigue level of each driver is 1 on this 10 km freeway section; or there are greater than 0 and less than or equal to 5 vehicles whose the fatigue level of each driver is 2 on this 10 km of freeway section; or there are greater than 5 and less than or equal to 10 vehicles whose the fatigue level of each driver is 1 and greater than 0 and less than or equal to 5 whose the fatigue level of each driver is 2 on this 10 km of freeway section, indicating that the safety of this road section is low, and this road section is a medium-risk road section.

The fatigue safety index of D indicates that there are more than 10 vehicles whose the fatigue level of each driver is 1 on this 10 km of freeway section; or there are greater than 5 and less than or equal to 10 vehicles whose the fatigue level of each driver is 2; or there are more than or equal to 1 vehicle whose the fatigue level of each driver is 3 on this 10 km of freeway section, indicating that the safety of this road section is very low, this section is a high-risk section.

In one illustrated embodiment, the server receives real-time fatigue level information of drivers from all freeway sections through the online communicator, combines with the real-time positioning of the drivers corresponding to the fatigue level information, and defines the fatigue safety index of every 10 km of freeway section according to the number of vehicles corresponding to different levels of fatigue level in every 10 km of freeway section. Moreover, the server transmit the fatigue safety index information to the navigation device through the online communicator, so that the fatigue safety index can be displayed on the map of the navigation device, so that the fatigue safety index can be displayed on the map of the navigation device, the fatigue-driving vehicle information in the freeway section can be shared with the local traffic management department and surrounding vehicles through the navigation map, which plays an early-warning role.

Figure 2:
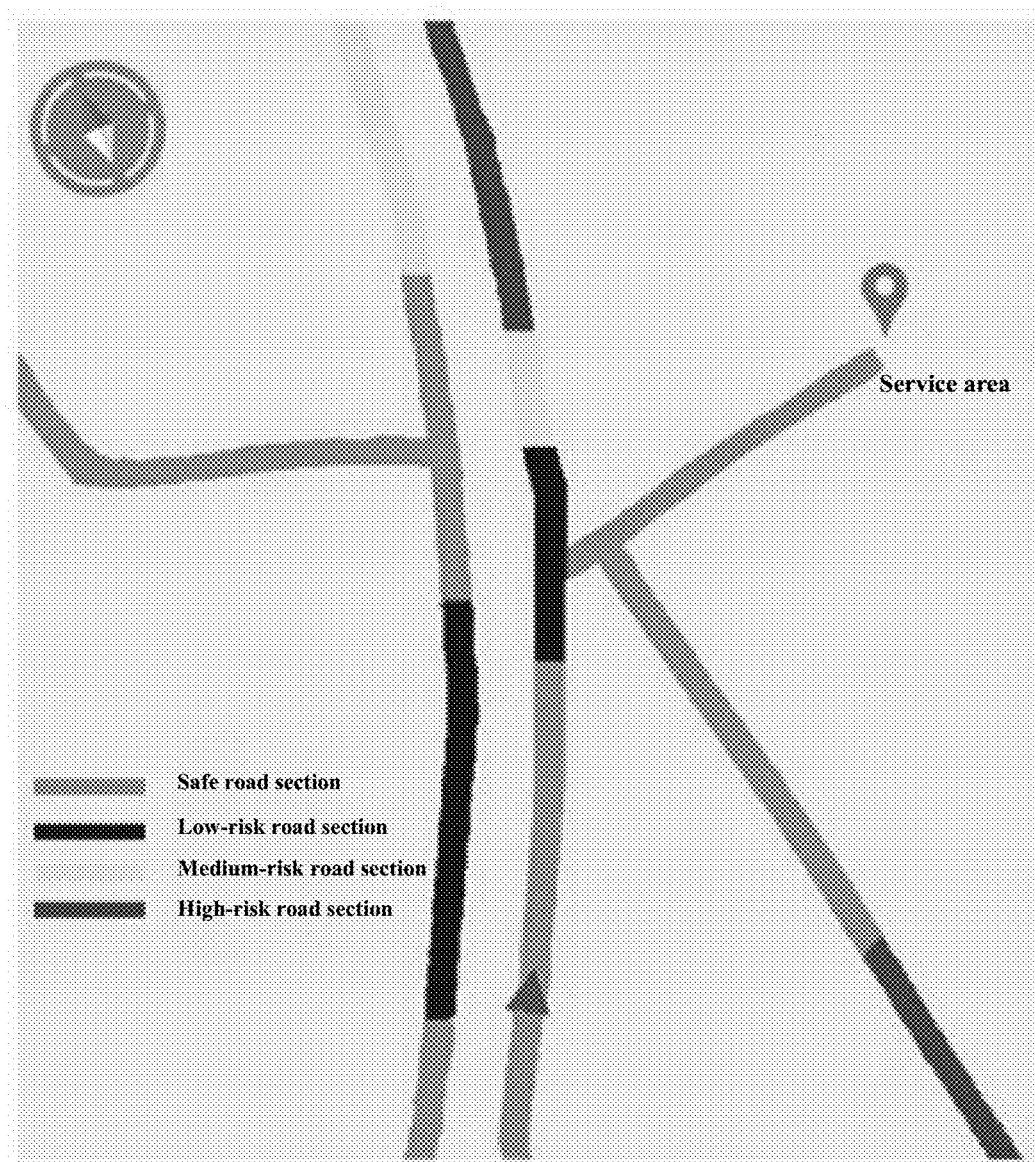
FIG. 2 is a schematic view of a cloud map of fatigue road conditions according to the disclosure.

Further, in order to visualize the fatigue safety index and facilitate traffic management departments and drivers of surrounding vehicles to more intuitively, clearly and quickly identify the safety of freeway sections, the disclosure further proposes a concept of a cloud map of fatigue road conditions shown in FIG. 2. The navigation device displays the received fatigue safety index information on the map of the navigation device in different colors. The corresponding relationship is: the fatigue safety index A corresponding to a first color (e.g., green in a colored cloud map), indicating that the freeway section is a safe road section; the fatigue safety index B corresponding to a second color (e.g., blue in the colored cloud map), indicating that the freeway section is a low-risk road section; the fatigue safety index C corresponding to a third color (e.g., yellow in the colored cloud map), indicating that the freeway section is a medium-risk road section; and the fatigue safety index D corresponding to a fourth color (e.g., red in the colored cloud map), indicating that the freeway section is a high-risk road section. After matching the position information of the road section with the fatigue safety index information, the server feeds back to the navigation device through the online communicator, so that the navigation device fills the fatigue safety index with different colors on the freeway section according to the above-mentioned corresponding relationship to generate a cloud map of fatigue road conditions. After that, the online communicator shares the generated cloud map information to all users. The traffic management departments and all drivers on the freeways can use mobile phones, computers and other terminal devices to obtain real-time cloud map of fatigue road conditions information through navigation maps, which can enable the traffic management department to quickly and accurately judge the road section where the fatigue-driving vehicles are located, and then take management and control measures. In addition, it can also enable other vehicle drivers to autonomously determine the safety degree of the road they are driving, identify fatigue-driving vehicles, and adopt methods such as slowing down, changing lanes, and maintaining vehicle distance, so as to avoid traffic accidents.

The above solutions have greatly improved the work efficiency of relevant staff of the traffic management departments, obtained the most timely and reliable data for the traffic management departments, completed the important mission of ensuring people's traffic safety and ensured the driving safety of the freeways.

TABLE 1

Fatigue level look-up table

| Fatigue characteristic posture frequency | Driving time | | | | | |
|---|---|---|---|---|---|---|
| | 0-2 h | 2-2.5 h | 2.5-3 h | 3-3.5 h | 3.5-4 h | ≥4 h |
| | Fatigue level | | | | | |
| No fatigue characteristic posture | 0 | 0 | 0 | 1 | 2 | 3 |
| One first-level fatigue characteristic posture | 1 | 1 | 1 | 2 | 2 | 3 |
| One second-level fatigue characteristic posture | 1 | 2 | 2 | 2 | 3 | 3 |
| One third-level fatigue characteristic posture | 3 | 3 | 3 | 3 | 3 | 3 |
| Another first-level fatigue characteristic posture occurred within 10 min after one first-level fatigue characteristic posture | 2 | 2 | 2 | 3 | 3 | 3 |
| One second-level fatigue characteristic posture occurred within 10 min after one first-level fatigue characteristic posture | 2 | 2 | 3 | 3 | 3 | 3 |
| One third-level fatigue characteristic posture occurred within 10 min after one first-level fatigue characteristic posture | 3 | 3 | 3 | 3 | 3 | 3 |
| One first-level fatigue characteristic posture occurred within 10 min after one second-level fatigue characteristic posture | 2 | 2 | 3 | 3 | 3 | 3 |
| Another second-level fatigue characteristic posture occurred within 10 min after one second-level fatigue characteristic posture | 2 | 3 | 3 | 3 | 3 | 3 |
| One third-level fatigue characteristic posture occurred within 10 min after one second-level fatigue characteristic posture | 3 | 3 | 3 | 3 | 3 | 3. |

What is claimed is:

1. A fatigue driving monitoring, reminding and early-warning system based on computer vision, comprising:
 a fatigue real-time monitoring system, a fatigue automatic reminding system, and a fatigue information early-warning system;
 wherein the fatigue real-time monitoring system is configured to identify fatigue characteristic postures of a driver, and obtain a fatigue level according to frequencies of the fatigue characteristic postures and a driving time;
 wherein the fatigue automatic reminding system is configured to receive the fatigue level, obtain a vehicle real-time position information, and provide the driver with a corresponding grade of reminder according to the fatigue level;
 wherein the fatigue information early-warning system is configured to receive the fatigue level sent by the fatigue real-time monitoring system and the vehicle real-time position information sent by the fatigue automatic reminding system, obtain a fatigue safety index according to numbers of vehicles corresponding to different fatigue levels in every predetermined number of kilometers (km) of freeway section, obtain a cloud map of fatigue road conditions according to the fatigue safety index, and share the cloud map of fatigue road conditions to traffic management departments and drivers for early-warning.

2. The fatigue driving monitoring, reminding and early-warning system according to claim 1, wherein the predetermined number of kilometers is 10 km.

3. The fatigue driving monitoring, reminding and early-warning system according to claim 2, wherein the fatigue real-time monitoring system comprises a video recording device, a driving timing device and an analysis processor;
 wherein the video recording device is configured to monitor and record action states of the driver in real time, and send video image information recording the action states of the driver to the analysis processor;
 wherein the driving timing device is configured to record the driving time and send the driving time to the analysis processor; and
 wherein the analysis processor is configured to receive the video image information and the driving time, generate digital information from the video image information recording the action states of the driver, identify the fatigue characteristic postures of the driver, and obtain the fatigue level of the driver in combination with the driving time.

4. The fatigue driving monitoring, reminding and early-warning system according to claim 3, wherein the analysis processor is concretely configured to identify the fatigue characteristic postures of the driver based on skeletal node recognition;
 wherein the fatigue characteristic postures are classified into three levels, comprising a first-level fatigue characteristic posture including stretching and yawning, a second-level fatigue characteristic posture including frequent blinking and rubbing eyes, and a third-level fatigue characteristic posture including closing eyes and frequent nodding.

5. The fatigue driving monitoring, reminding and early-warning system according to claim 4, wherein the fatigue level is one of four levels including: normal state, mild fatigue, moderate fatigue and severe fatigue;
 wherein the normal state is that:
  the driving time is less than or equal to 3 hours since the vehicle is started, and during which none of the fatigue characteristic postures of the driver has been detected;
 wherein the mild fatigue is selected from the group consisting of that:
  (1) the driving time is more than 3 hours and less than 3.5 hours since the vehicle is started, and during which none of the fatigue characteristic postures of the driver has been detected;
  (2) the driving time is less than 3 hours since the vehicle is started, and during which the first-level fatigue characteristic posture of the driver has been detected once; and
  (3) the driving time is less than 2 hours since the vehicle is started, and during which the second-level fatigue characteristic posture of the driver has been detected once;
 wherein the moderate fatigue is selected from the group consisting of that:
  (1) the driving time is more than 3.5 hours and less than 4 hours since the vehicle is started, and during which none of the fatigue characteristic postures of the driver has been detected;
  (2) the driving time is more than 3 hours and less than 4 hours since the vehicle is started, and during which the first-level fatigue characteristic posture of the driver has been detected once;
  (3) the driving time is more than 2 hours and less than 3.5 hours since the vehicle is started, and during which the second-level fatigue characteristic posture of the driver has been detected once;
  (4) the driving time is less than 3 hours since the vehicle is started, and during which another first-level fatigue characteristic posture of the driver occurs within 10 minutes after one first-level fatigue characteristic posture of the driver has been detected;
  (5) the driving time is less than 2.5 hours since the vehicle is started, and during which one second-level fatigue characteristic posture of the driver occurs within 10 minutes after one first-level fatigue characteristic posture of the driver has been detected;
  (6) the driving time is less than 2.5 hours since the vehicle is started, and during which one first-level fatigue characteristic posture of the driver occurs within 10 minutes after one second-level fatigue characteristic posture of the driver has been detected; and
  (7) the driving time is less than 2 hours since the vehicle is started, and during which another second-level fatigue characteristic posture of the driver within 10 minutes after one second-level fatigue characteristic posture of the driver has been detected;
 wherein the severe fatigue is selected from the group consisting of that:
  (1) in any case where the driving time is greater than or equal to 4 hours;
  (2) the third-level fatigue characteristic posture of the driver has been detected once or more than once in any driving time since the vehicle is started;
  (3) the driving time is more than 3.5 hours since the vehicle is started, and during which the second-level fatigue characteristic posture of the driver has been detected once;
  (4) the driving time is more than 3 hours since the vehicle is started, and during which another first-level fatigue characteristic posture of the driver occurs within 10 minutes after one first-level fatigue characteristic posture of the driver has been detected;

(5) the driving time is more than 2.5 hours since the vehicle is started, and during which one second-level fatigue characteristic posture of the driver occurs within 10 minutes after one first-level fatigue characteristic posture of the driver has been detected;

(6) the driving time is more than 2.5 hours since the vehicle is started, and during which one first-level fatigue characteristic posture of the driver occurs within 10 minutes after one second-level fatigue characteristic posture of the driver has been detected; and (7) the driving time is more than 2 hours since the vehicle is started, and during which another second-level fatigue characteristic posture of the driver within 10 minutes after one second-level fatigue characteristic posture of the driver has been detected.

6. The fatigue driving monitoring, reminding and early-warning system according to claim 2, wherein the fatigue real-time monitoring system is further configured to monitor a cold uncomfortable posture and a hot uncomfortable posture of the driver;

wherein the fatigue real-time monitoring system further comprises an air temperature and humidity monitoring device, and the air temperature and humidity monitoring device is configured to monitor an air temperature and a humidity in a cab of the vehicle;

wherein the fatigue real-time monitoring system further comprises a $CO_2$ concentration monitoring device, and the $CO_2$ concentration monitoring device is configured to monitor a $CO_2$ concentration in the cab of the vehicle.

7. The fatigue driving monitoring, reminding and early-warning system according to claim 2, wherein the fatigue automatic reminding system comprises an intelligent voice device, a global positioning system (GPS) locator, a navigation device, a vibrating seat device and a cab air conditioning device;

wherein the intelligent voice device, the vibrating seat device and the cab air conditioning device are configured to receive the fatigue level and make a corresponding response according to the fatigue level;

wherein the GPS locator is configured to determine a real-time position, a driving speed and a driving direction of the vehicle;

wherein the navigation device is configured to obtain a distance between a current position of the vehicle and a target position, and a shortest route; and wherein the cab air conditioning device is configured to adjust a temperature and a humidity of the cab.

8. The fatigue driving monitoring, reminding and early-warning system according to claim 7, wherein when the fatigue level is a normal state, the fatigue automatic reminding system gives no response, and each of the systems operates normally;

wherein when the fatigue level is a mild fatigue, the intelligent voice device broadcasts: "you are in the mild fatigue, please slow down";

wherein when the fatigue level is a moderate fatigue, the intelligent voice device broadcasts: "you are in the moderate fatigue, please slow down immediately and rest in a nearest rest area", and the navigation device displays a route between the current position of the vehicle and the nearest rest area of the freeway; and wherein when the fatigue level is a severe fatigue, the intelligent voice device broadcasts: "you are in the severe fatigue, please slow down immediately and rest in the nearest rest area!", the navigation device displays a route between the current position of the vehicle and the nearest rest area of the freeway, the vibrating seat device starts a vibration with random amplitude and frequency, and the cab air conditioning device sends cooled air with a low temperature and a high speed.

9. The fatigue driving monitoring, reminding and early-warning system according to claim 2, wherein the fatigue information early-warning system comprises an online communicator and a server;

wherein the online communicator is configured to send the fatigue level and the vehicle real-time position information to the server;

wherein the server is configured to integrate fatigue levels and position information of drivers to obtain the fatigue safety index in every 10 km of freeway section, then send the obtained fatigue safety index to the fatigue real-time monitoring system, and the fatigue real-time monitoring system draws a real-time cloud map of fatigue road conditions and share the real-time cloud map of fatigue road conditions to the traffic management departments and the drivers.

10. The fatigue driving monitoring, reminding and early-warning system according to claim 2, wherein the fatigue safety index is one of four levels comprising safe road section, low-risk road section, medium-risk road section and high-risk road section;

wherein the safe road section refers to a 10 km of freeway section on which the fatigue level of each of drivers for all vehicles is the normal state;

wherein the low-risk section refers to a 10 km of freeway section on which there are greater than 0 and less than or equal to 5 vehicles whose the fatigue level of each driver is the mild fatigue;

wherein the medium-risk road section refers to one selected from the group consisting of: a 10 km of freeway section on which there are greater than 5 and less than or equal to 10 vehicles whose the fatigue level of each driver is the mild fatigue, and a 10 km of freeway section on which there are greater than 0 and less than or equal to 5 vehicles whose the fatigue level of each driver is the moderate fatigue; and wherein the high-risk road section refers to one selected from the group consisting of: a 10 km of freeway section on which there are more than 10 vehicles whose the fatigue level of each driver is the mild fatigue, a 10 km of freeway section on which there are greater than 5 and less than or equal to 10 vehicles whose the fatigue level of each driver is the moderate fatigue, and a 10 km of freeway section on which there are more than or equal to 1 vehicle whose the fatigue level of each driver is the severe fatigue.

11. A fatigue driving monitoring, reminding and early-warning method based on computer vision, comprising:

step S1, monitoring a driving time, identifying fatigue characteristic postures of a driver, and obtaining a fatigue level according to the driving time and a result of identifying the fatigue characteristic postures;

step S2, providing the driver with a corresponding grade of reminder according to the fatigue level and obtaining a vehicle real-time position information to plan a route to a nearest rest area, when the fatigue level exceeds a level threshold; and step S3, obtaining the fatigue level and the vehicle real-time position information, obtaining a fatigue safety index according to the fatigue level and the vehicle real-time position information, drawing a cloud map of fatigue road conditions according to the fatigue safety index, and sharing the cloud map of fatigue road conditions to traffic management departments and drivers for early-warning.

\* \* \* \* \*